United States Patent [19]

Wingler et al.

[11] 4,384,097
[45] May 17, 1983

[54] CONTACT LENSES OF METHYL METHACRYLATE COPOLYMERS

[75] Inventors: Frank Wingler; Bernd Leusner; Peter Schwabe, all of Leverkusen; Otto-Christian Geyer, Wetzlar, all of Fed. Rep. of Germany

[73] Assignee: Bayer Aktiengesellschaft, Leverkusen, Fed. Rep. of Germany

[21] Appl. No.: 195,553

[22] Filed: Oct. 9, 1980

[30] Foreign Application Priority Data

Oct. 13, 1979 [DE] Fed. Rep. of Germany ....... 2941586

[51] Int. Cl.³ .................. C08F 220/10; C08F 220/26; G02C 7/04
[52] U.S. Cl. ............. 526/328.5; 351/160 R; 351/160 H; 526/320; 526/329.7
[58] Field of Search ............. 526/320, 328.5, 329.7; 351/160 R, 160 H

[56] References Cited

U.S. PATENT DOCUMENTS

| | | | |
|---|---|---|---|
| 3,284,394 | 11/1966 | Suen et al. | 526/320 |
| 3,503,942 | 3/1970 | Seiderman | 526/320 |
| 3,850,892 | 11/1974 | Shen | 526/320 |
| 3,892,721 | 7/1975 | Gustafson | 526/320 |
| 3,950,314 | 4/1976 | Graff | 526/329.7 |
| 3,951,528 | 4/1976 | Leeds | 526/320 |
| 4,028,295 | 7/1977 | Loshaek | 526/320 |
| 4,038,264 | 7/1977 | Rostoker et al. | 526/320 |
| 4,246,382 | 1/1981 | Honda et al. | 526/329.7 |

Primary Examiner—Harry Wong, Jr.
Attorney, Agent, or Firm—Connolly & Hutz

[57] ABSTRACT

Contact lenses and contact shells of light-refracting material consisting essentially of a copolymer of (I) from 40 to 90% by weight of methyl methacrylate and
(II) from 10 to 60% by weight of methyl acrylate and/or esters corresponding to formula (1):

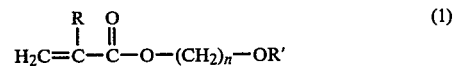

in which
R represents H or $CH_3$,
R' represents H, $CH_3$ or $C_2H_5$ and
n=1 or 2, the sum of I and II amounting to 100% by weight.

3 Claims, No Drawings

CONTACT LENSES OF METHYL METHACRYLATE COPOLYMERS

This invention relates to ophthalmic contact lenses and contact shells of special copolymers of methyl methacrylate and to the use of these copolymers for the production of light-refracting, semi-rigid materials absorbing only small quantities of water for contact lenses.

Several different polymers are already being used for contact lenses. The materials are in direct contact with the cornea and, accordingly, have a major bearing on the metabolic processes and on the oxygen balance. As a result of this direct contact, the materials can cause mechanical and chemical irritation to the eyes.

Contact lenses are generally divided into two main types, namely hard lenses and hydrophilic soft lenses. Lenses of the first type have been known for many years and are normally made of polymethyl methacrylate which may be cut and polished to give lenses having favourable optical properties. However, hard polymethyl methacrylate lenses are attended by the disadvantage that they irritate the cornea and the interior of the eyelid. Accordingly, if a patient is to wear hard lenses, a considerable period of acclimatisation is required, during which the patient wears the lenses for gradually increasing periods up to a maximum of about 8 hours' continuous wear.

In view of this deficiency of hard contact lenses, they are only used by a small number of spectacle wearers.

Soft contact lenses which consist of hydrogels of hydrophilic polymers have been introduced in recent years. These soft contact lenses have enabled the problem of irritation to be largely overcome, so that the patient can now become accustomed much more quickly to wearing contact lenses.

Although soft hydrophilic lens materials based on hydroxyethyl methacrylate and/or vinyl pyrrolidone are initially much more comfortable to wear than hard lenses by virtue of their hydrophilic character, they are nevertheless attended by the serious disadvantage that products of metabolism can be deposited in them and bacteria, spores or fungi can penetrate into them, thus exposing the eye to infection. Even where nonhydrophilic materials, for example silicone rubber (U.S. Pat. No. 3,996,189), are used, eye damage can be caused in some cases by migrating chemical constituents, by the lipophilic character of the materials and by changes in their surface condition.

An intermediate position between these so-called soft lenses and hard lenses is occupied by the semi-rigid lenses. Cellulose acetobutyrate is used as the base material for semi-rigid lenses. Compatibility is generally better than in the case of hard polymethyl methacrylate lenses by virtue of better wettability, lower mechanical stressing and greater thermal conductivity. Under a hard to semi-rigid lens, transport of the lacrimal liquid is not impeded to the same extent as it is under a soft lens in firm contact with the eye. One disadvantage of cellulose acetobutyrate lenses is that the materials often contain plasticisers and processing aids because cellulose acetobutyrate cannot be processed without additives. Also, cellulose acetobutyrate is not completely transparent in optical terms. Part of the light is dispersed, which leads to increased dazzling, particularly when driving in the dark. Accordingly, there is a need for semi-rigid optical materials with minimal light dispersion which are wettable and chemically inert to substantially the same extent as cellulose acetobutyrate.

It has now been found that contact-lens materials characterised by excellent compatibility, high permeability to light and minimal dispersion of light can be obtained by using, as the light-refracting material, semi-rigid copolymers of methyl methacrylate and water-soluble esters of acrylic and methacrylic acid of which the homopolymers have a glass transition temperature below 40° C. In addition, these polymers have the advantage that they are free from plasticisers and processing stabilisers because their thermoplastic processing does not require additives such as these.

The present invention provides contact lenses and contact shells of a light-refracting material consisting essentially of copolymer of (I) from 40 to 90% by weight of methyl methacrylate and (II) from 10 to 60% by weight of methyl acrylate and/or esters correponding to formula (1):

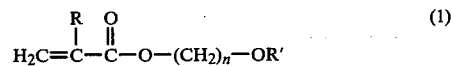

in which

R represents H or $CH_3$,

R' represents H, $CH_3$ or $C_2H_5$ and n = 1 or 2, the sum of I and II amounting to 100% by weight.

Suitable esters of formula (1) are, for example, acrylic acid hydroxyethyl esters and the methoxymethyl, methoxyethyl, ethoxymethyl and ethoxyethyl esters of acrylic and methacrylic acid.

Copolymers of this type have glass transition temperatures of from 40° to 70° C. and a water uptake capacity of from 1.5 to 6% by weight.

The semi-rigid contact lenses or contact shells according to the invention are distinguished by the fact that they are very comfortable to wear and by their physiological neutrality. They take up water to a limited extent only, and for this reason, do not store bacteria, spores and fungi or metabolism products and sterilising agents. They do not contain any low molecular weight additives which could migrate and damage the eye. There is no need for vulcanisation aids or fillers to be used. Particular emphasis may be placed on the high wettability of the lenses and shells according to the invention with lacrimal fluid and upon their low solubility in fats.

The copolymers are produced by known methods of solution polymerisation, block polymerisation or bulk polymerisation. The copolymers are preferably produced by the bulk polymerisation process described in German Offenlegungsschrift No. 2,724,360. Highly transparent copolymers characterised by a particular chemical uniformity are obtained by that method.

The copolymers may be directly injection-moulded to form lenses. It is also possible initially to produce blanks which may then be machined and polished. Processing into contact lenses or contact shells is carried out in known manner by injection-moulding in moulds, by centrifugal moulding in moulds or by stamping or punching from films, powders or granulates.

EXAMPLES

The monomer mixtures shown in Table 1 below are polymerised by the bulk polymerisation process described in German Offenlegungsschrift No. 2,724,360. The composition and properties of the polymers are shown in Table 2 below.

TABLE 1

| Monomer mixture | | | |
|---|---|---|---|
| A | B | C | D |
| MAM 60% by weight | MAM 80% by weight | MAM 50% by weight | MAM 70% by weight |
| AM 40% by weight | AOM 20% by weight | MMOE 50% by weight | MEOE 30% by weight |

Regulator—0.2% by weight of ethylene glycol dithiomercaptoacetate
MAM: methyl methacrylate
AM: methyl acrylate
AOM: methoxymethyl acrylate
MMOE: 2-methoxyethyl methacrylate
MEOE: 2-ethoxyethyl methacrylate

TABLE 2

| | Polymers | | | |
|---|---|---|---|---|
| | A | B | C | D |
| | MAM 83% by weight | MAM 85% by weight | MAM 50% by weight | MAM 45% by weight |
| | AM 17% by weight | AOM 15% by weight | MMOE 50% by weight | MEOE 55% by weight |
| Glass transition temperature (a) | 60° C. | 55° C. | 50° C. | 55° C. |
| Water uptake | 2.5% by weight | 3% by weight | 6% by weight | 5% by weight |
| Permeability to light (b), (c) | 96% | 97% | 97% | 96% |

(a) as measured by differential thermoanalysis
(b) cellulose acetobutyrate: 85%
(c) as measured on a hydrated, 0.2 mm thick contact lens Polymers A to D were injection-moulded to form lens blanks which were then lathe-turned to form contact lenses and contact shells, so-called scleral shells.

Patients which had been accustomed to wearing polymethyl methacrylate lenses or shells noticed subjectively better compatibility and a more pleasant feeling after the polymethyl methacrylate lenses had been replaced by the lenses of polymers A to D. In cases where scleral shells had to be worn on account of curving or scarring of the cornea or damage to the eye, materials A to D enabled wearing time to be increased by 30 to 150% in relation to polymethyl methacrylate shells. The patients observed less dazzling compared with lenses of cellulose acetobutyrate.

We claim:

1. Contact lenses or contact shells of light-refracting material having a glass transition temperature of 40° to 70° C. and consisting essentially of a chemically uniform copolymer
(I) from 40 to 90% by weight of methyl methacrylate and
(II) from 10 to 60% by weight of methyl acrylate and/or esters corresponding to the formula

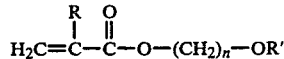

in which
R represents H or CH$_3$,
R' represents CH$_3$ or C$_2$H$_5$ and
n=1 or 2,
the sum of I and II amounting to 100% by weight.

2. Contact lenses or contact shells as claimed in claim 1 containing as component II methyl acrylate, methoxymethyl acrylate, 2-methoxyethyl methacrylate or 2-ethoxyethyl methacrylate.

3. Contact lenses or contact shells as claimed in claim 1 containing as component II methyl acrylate.

* * * * *